(12) United States Patent
Benthien et al.

(10) Patent No.: US 10,413,067 B2
(45) Date of Patent: Sep. 17, 2019

(54) ADHESIVE RETAINER FOR FIXING TO A STRUCTURE

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 325 days.

(21) Appl. No.: 14/817,929

(22) Filed: Aug. 4, 2015

(65) Prior Publication Data
US 2016/0037921 A1  Feb. 11, 2016

(30) Foreign Application Priority Data

Aug. 6, 2014  (DE) .......................... 10 2014 215 547

(51) Int. Cl.
*A47G 1/17* (2006.01)
*A47B 91/08* (2006.01)
(Continued)

(52) U.S. Cl.
CPC ............ *A47B 91/08* (2013.01); *F16B 11/006* (2013.01); *H02G 3/305* (2013.01)

(58) Field of Classification Search
USPC ... 248/683, 550, 205.3, 205.4, 205.5, 205.6, 248/205.8, 205.9, 206.3, 309.3, 309.2,
(Continued)

(56) References Cited

U.S. PATENT DOCUMENTS 2,128,118 A * 8/1938 Burford .................. A47K 5/04
                                                    248/206.3
3,071,886 A * 1/1963 Stiller ..................... A47K 5/04
                                                    248/206.3
(Continued)

FOREIGN PATENT DOCUMENTS

CN        102470636 A      5/2012
DE         818 280 B       10/1951
(Continued)

OTHER PUBLICATIONS

German Search Report for Application No. 10 2014 215 547.9 dated Apr. 13, 2015.
(Continued)

*Primary Examiner* — Terrell L McKinnon
*Assistant Examiner* — Michael McDuffie
(74) *Attorney, Agent, or Firm* — Jenkins, Wilson, Taylor & Hunt, P.A.

(57) ABSTRACT

An adhesive retainer for fixing to a structure has at least one adhesive foot which has a supporting base region formed on the adhesive foot and is provided with receiving openings which extend like capillaries through the supporting base region into the interior of the adhesive foot. The receiving openings are configured to form an integral bond with the structure such that when the adhesive foot is placed on the structure covered for this purpose with a liquid, solidifiable bonding substance, the receiving openings receive bonding substance due to capillary ascension.

17 Claims, 8 Drawing Sheets

(51) Int. Cl.
*F16B 11/00* (2006.01)
*H02G 3/30* (2006.01)

(58) Field of Classification Search
USPC .............. 248/363, 901, 467, 544; 428/317.1, 428/317.5, 317.7, 343, 355 R
See application file for complete search history.

(56) References Cited

U.S. PATENT DOCUMENTS

| | | | |
|---|---|---|---|
| 3,454,249 A | 7/1969 | Geisinger | |
| 4,582,739 A | 4/1986 | Kunert | |
| 4,593,878 A * | 6/1986 | Stewart | B60R 1/04 248/205.3 |
| 4,842,912 A * | 6/1989 | Hutter, III | B29C 65/02 156/247 |
| 5,011,316 A * | 4/1991 | Damon | A47K 5/05 248/206.3 |
| 6,124,016 A | 9/2000 | Weil | |
| 6,471,169 B1 * | 10/2002 | Maloney | A47G 1/17 248/205.3 |
| 6,773,780 B2 * | 8/2004 | Hutter, III | F16B 5/0208 403/267 |
| 7,191,990 B2 * | 3/2007 | Hutter, III | B64C 1/406 248/228.3 |
| 7,413,790 B2 * | 8/2008 | Hutter, III | H01R 4/04 174/5 R |
| 7,815,988 B2 | 10/2010 | Stumpf et al. | |
| 8,292,253 B2 * | 10/2012 | Zhadanov | A47K 5/04 248/205.3 |
| 8,297,568 B2 * | 10/2012 | Nakamura | H01L 21/6838 248/206.1 |
| 8,318,278 B2 * | 11/2012 | Arnal | F16B 11/006 156/247 |
| 8,678,332 B2 | 3/2014 | Benthien et al. | |
| 2004/0023581 A1 | 2/2004 | Bersuch | B29C 65/562 442/149 |
| 2005/0222376 A1 * | 10/2005 | Sassi | C08L 77/00 528/310 |
| 2007/0006967 A1 * | 1/2007 | Sanftleben | B29C 66/1142 156/275.7 |
| 2008/0260579 A1 * | 10/2008 | Neubert | C12Q 1/001 422/400 |
| 2008/0302274 A1 * | 12/2008 | Neubert | C09D 7/1233 106/287.25 |
| 2010/0092768 A1 * | 4/2010 | Neubert | B32B 7/06 428/337 |
| 2011/0059290 A1 | 3/2011 | Gage et al. | |
| 2012/0207974 A1 | 8/2012 | Maier et al. | |
| 2014/0182050 A1 * | 7/2014 | Ameil | A62D 5/00 2/457 |
| 2016/0272295 A1 | 9/2016 | Benthien et al. | |

FOREIGN PATENT DOCUMENTS

| | | |
|---|---|---|
| DE | 17 65 912 B | 11/1971 |
| DE | 33 20 157 A1 | 12/1984 |
| DE | 10105893 A1 | 8/2002 |
| DE | 10143542 A1 | 3/2003 |
| DE | 20 2004 010375 U1 | 11/2005 |
| DE | 60307124 T2 | 12/2006 |
| DE | 10 2006 012411 A1 | 4/2007 |
| DE | 10 2008 040577 A1 | 2/2010 |
| DE | 10 2009 002838 A1 | 11/2010 |
| DE | 10 2009 028583 A1 | 2/2011 |
| DE | 10 2010 026877 A1 | 1/2012 |
| DE | 10 2014 215 547 A1 | 2/2016 |
| EP | 2292709 A2 | 3/2011 |
| EP | 2354566 A2 | 8/2011 |
| EP | 2982872 B1 | 1/2019 |
| WO | WO 2006/032954 A1 | 3/2006 |

OTHER PUBLICATIONS

European Search Report for European Application No. 15178792.6 dated Jan. 5, 2016.
First Chinese Office Action for Chinese Application No. 201510475376.2 dated Mar. 3, 2017.
Second Chinese Office Action for Chinese Application No. 201510475376.2 dated Nov. 8, 2017.
Third Chinese Office Action for Chinese Application No. 201510475376.2 dated May 22, 2018.
German Search Report for German Application No. 10 2015 205 016 dated Oct. 16, 2017.
Restriction Requirement for Application No. 15/073,244 dated Jul. 27, 2018.
"flow, n.1." OED Online, Oxford University Press, Dec. 2018, www.oed.com/view/Entry/71998.Accessed Dec. 4, 2018 (Year: 2018).
Non-Final Office Action for Application No. 15/073,244 dated Dec. 26, 2018.
Fourth Chinese Office Action for Chinese Application No. 20151047537.2 dated Feb. 26, 2019.

* cited by examiner

ADHESIVE RETAINER FOR FIXING TO A STRUCTURE

CROSS-REFERENCE TO RELATED APPLICATION

This application claims priority to DE 10 2014 215 547.9 filed Aug. 6, 2014, the entire disclosure of which is incorporated by reference herein.

TECHNICAL FIELD

The present disclosure relates to an adhesive retainer for fixing to a structure. The present disclosure relates in particular to an adhesive retainer for fixing to a structure of an aircraft or spacecraft.

BACKGROUND

Although the present disclosure and the problem addressed thereby can be applied to various adhesive retainers for fixing to different structures, they will be described in more detail with respect to an aircraft.

Modern aircraft have a vast number of lines, such as power lines, data cables or water lines. These lines are fixed, inter alia, to the primary structure in predefined positions by appropriate fixing devices or retaining devices. For example, specific fasteners are used which clamp around the cables or lines to be received and fix them relative to the primary structure. To supply the highly complex technical infrastructure of modern aircraft, it is usually necessary to attach thousands of different fasteners.

Fasteners of this type are often fastened mechanically to the primary structure by riveted connections or screw connections directly or via intermediate parts provided therefor. Alternatively or in combination, adhesive retainers are also used which are attached to the structure by one or more planar adhesive films.

Using adhesive connections of this type which are relatively easy to attach, in many cases of use it is possible to reduce weight compared to purely mechanical connections.

DE 10 2009 002 838 A1 for example discloses an adhesive retainer for retaining a component which defines a predetermined, precisely adjusted adhesive thickness to allow advantageous adhesion characteristics. DE 10 2010 026 877 A1 for example describes an adhesive retainer with an adapter and a counter element which allow the introduction of a force into a structural element exclusively while applying a compressive stress and a shear stress. This allows retaining devices which can be permanently loaded.

SUMMARY

In view of the above, one idea of the present disclosure is to provide a lightweight adhesive retainer which is particularly simple to install and which allows a stable and secure attachment to a structure.

According thereto, an adhesive retainer for fixing to a structure is provided with at least one adhesive foot which has a supporting base region. The supporting base region is formed on the adhesive foot and is provided with receiving openings which extend like capillaries into the interior of the adhesive foot through the supporting base region.

A method for fixing an adhesive retainer to a structure is also provided. The method comprises placing a supporting base region of an adhesive foot of an adhesive retainer onto the structure which is covered with a liquid, solidifiable bonding substance. The method further comprises wetting the supporting base region of the adhesive foot with the liquid bonding substance and receiving the liquid bonding substance into receiving openings which extend like capillaries into the interior of the adhesive foot through the supporting base region. The method also further comprises solidifying the liquid bonding substance at least in the region of the applied adhesive foot.

A fundamental idea of the present disclosure is to provide an adhesive retainer in which the effective adhesion surface is increased many times over compared to conventional planar adhesion surfaces. Here, the adhesion surface denotes the bonding surface via which a retainer and a structure are joined together by a bonding substance. For this purpose, the solution according to the disclosure herein provides specifically configured receiving openings which are formed through the supporting base region into the adhesive retainer. For assembly, when an adhesive retainer of this type is placed on a structure covered with an appropriate bonding substance, the receiving openings receive the bonding substance due to their capillary-like form. This increases the effective adhesion surface, because the total adhesion surface is formed as the sum of the supporting base region and the inner surface, wetted with bonding substance, of the receiving openings. After the adhesive retainer has been placed on the structure covered with bonding substance, the bonding substance merely has to solidify to provide an integral bond between the adhesive retainer and the structure.

A particular advantage of the solution according to the disclosure herein is that, on the one hand, no expensive or heavy additional means, such as screws, nuts, bolts, shims etc. are required to fix a retainer to a structure. Furthermore, on the other hand, an adhesive bond is provided which, with the same support surface, is significantly more loadable than for example adhesive bonds in which two planar, closed surfaces are bonded adhesively one on top of the other. The strength of an adhesive bond is determined in particular by the effective adhesion surface which, in the case of the present solution, is many times greater than in the case of a conventional planar surface adhesion (here identical conditions are assumed for the join between bonding substance and structure). In a specific case of use, to achieve a particular desired minimum loading capacity in the case of the adhesive retainer according to the disclosure herein, the support surface and thereby also the adhesive retainer can overall be configured significantly smaller, as long as the effective adhesion surface remains of an adequate size. The adhesive retainer according to the disclosure herein can thereby be configured to be significantly more weight-efficient, subject to use, which in turn saves fuel and reduces costs. Furthermore, an adhesive retainer of this type can be mounted in a flexible, simple and rapid manner without expensive additional aids.

Advantageous embodiments and developments are set out in the further subclaims and in the description with reference to the figures.

For example, the receiving openings can be configured to form an integral bond with the structure, such that when the adhesive foot is placed on the structure which has been covered for this purpose with a liquid, solidifiable bonding substance, the receiving openings receive liquid bonding substance due to capillary ascension. The receiving openings are configured like capillaries so that when the supporting base region is wetted with the liquid bonding substance, the substance rises into the receiving openings due to the adhesive forces acting between the bonding substance and the adhesive retainer. This is known as capillary ascension and is a possible form of the physical capillary effect. Consequently, the inside surface of the receiving openings is wetted with bonding substance and the effective adhesion surface is increased by this portion. How high or deep the bonding substance rises into the receiving openings depends on various factors, such as the materials or substances used (for example density, viscosity, porosity etc.) and on the shape of the capillaries, i.e. in particular on the diameter or the cross-sectional surface of the receiving openings. Depending on the desired effect and use, specific marginal conditions have to be met for the capillarity and the materials have to be selected or possibly also pretreated accordingly.

According to a development, the receiving openings are configured to receive lacquer and/or paint and/or adhesive and/or synthetic resin or the like as the liquid bonding substance. Accordingly, in a development the method also provides liquid, solidifiable bonding substances which comprise lacquer and/or paint and/or adhesive and/or synthetic resin or the like. Thus, in particular not only can actual adhesives be used, but so can paints and lacquers.

For example, the bonding substance can be a lacquer which has been applied to a structural component of an aircraft. In this case, the retainer can be attached to the structural component even during lacquering of the component, as long as the lacquer has not yet cured. The lacquer wets the supporting base region and penetrates inside the receiving openings. As soon as the lacquer has cured, the adhesive retainer is rigidly connected to the structural component. Thus, here the lacquer acts in a sense as an adhesive so that an additional adhesive is no longer required. This also has the particular advantage, inter alia, that the adhesive retainer can be mounted when an aircraft is being lacquered and no longer has to be mounted in the subsequent production. Furthermore, problems are avoided which can traditionally arise during adhesion, which is usually carried out in a subsequent step.

Furthermore, the adhesive retainer according to the disclosure herein has an advantage that the receiving openings filled with the bonding substance automatically prevent the spread of cracks which can possibly form for various reasons in the lacquer or also generally in a bonding substance after solidification. Cracks of this type are caused for example by defects which can be associated in the widest sense with the adhesion procedure (or with the lacquering procedure etc.). For example, the bonding substance can become brittle due to aging processes, general material fatigue or external influences (for example the effects of heat or chemicals). The composition of the bonding substance can be suboptimal and/or incorrectly adapted to the materials of the components to be joined. In general, such cracks can also form as the result of permanently high stresses or acute overloading of the components. In particular, influences of this type are intensified when imperfections in the adhesive bond have occurred before or during mounting, for example due to an inadequate surface pretreatment or to non-planar surfaces, air inclusions in the bonding substance or other general mounting faults.

Alternatively, a structural component for an aircraft can firstly be lacquered and thereafter the adhesive retainer can be fixed to the component using an adhesive specifically applied for this purpose. For example, the adhesion surface can be prepared accordingly on the lacquer by laser ablation or similar processes. In principle, it is also possible here for redundancy for adhesive retainers according to the disclosure herein to be attached to a structure by a plurality of adhesion surfaces.

In the case of structures of carbon fiber-reinforced plastics, an adhesive retainer according to the disclosure herein can also be configured to be attached to the structures even while the structures are being produced. For example, the structure can be a prepreg, i.e. a semi-finished product of carbon fibers which are embedded in an uncured matrix of synthetic resin. Prepregs of this type are typically used for the production of various components of modern aircraft or spacecraft. The prepregs are usually firstly introduced into the mold and then "baked through" in an autoclave, i.e. the plastics matrix is cured by subjecting to pressure and temperature. An adhesive retainer according to the disclosure herein can, for example, be placed on such a prepreg or fixed thereto in another way. In this case, the synthetic resin acts as a bonding substance which passes into the receiving openings. The bond is then cured in the following autoclave process. In this case, the adhesive retainer is advantageously mounted during production of the structural components.

Accordingly, a development of the method also provides synthetic resin as the liquid, solidifiable bonding substance. In this development, the solidification step can comprise curing using an autoclave. For example, the method further comprises fixing the adhesive foot to the structure by at least one fixing needle. In this development, the adhesive retainer can be fixed to a prepreg before the prepreg is cured in an autoclave. Furthermore, in a development the method also comprises covering the structure with a film. In addition, the method can further comprise evacuating the covered structure through at least some of the receiving openings in the adhesive foot. Before the prepreg together with the adhesive retainer fastened thereto are subjected to pressure and temperature in the autoclave process, the prepreg is covered by a film and evacuated. Evacuation can be carried out via the openings in the adhesive retainer.

According to a development, the supporting base region can be planar or substantially planar. For many uses, a predominantly planar supporting base region is advantageous, for example because the adhesive retainer is provided to be fastened to a planar surface.

According to a development, the receiving openings extend substantially vertically from the supporting base region into the interior of the adhesive foot. In this development, the receiving openings are configured such that they can be used as simply and in as versatile a manner as possible, but at the same time they afford the capillary-like form required for utilising the capillary effect.

The adhesive retainer can comprise plastics material for example. The use of plastics material has a great advantage that weight and costs can be reduced.

Furthermore, the adhesive retainer can be formed in one piece. Combined with the previous development, the adhesive retainer can be produced for example by an additive-layer manufacturing method. This has an advantage that complex configurations can also be easily produced.

According to a development, the supporting base region of the at least one adhesive foot is configured with three or more projecting spacer pins. Spacer pins of this type make it possible, when placing the adhesive foot on a structure covered with bonding substance, to precisely adjust the thickness of the bonding layer, for example the thickness of the lacquer layer, so that optimum adhesion characteristics can be ensured. Alternatively, pins of this type can also be used to define separate bonding regions so that an adhesive retainer can be fastened to a structure via a plurality of surfaces.

According to a development, the supporting base region of the at least one adhesive foot is configured with at least one projecting fixing pin. A fixing pin of this type is used for example to fix the adhesive retainer in a specific position of the structure. Thus, a hole or another depression, acting as a marking, into which the fixing pin can be introduced during mounting of the adhesive retainer can be provided in the surface of the structure. In this development, the adhesive retainer can be fitted particularly easily to a structure in an intended position.

According to a development, two adhesive feet are formed which can be coupled together by a connecting element. For example, one of the adhesive feet is attached on one side of a structure, while the other adhesive foot is attached to the opposite side of the structure. This development can be used to improve the loading capacity of the adhesive bond and also to attach adhesive retainers to regions which are geometrically difficult to access.

For example, at least some of the receiving openings extend through the at least one adhesive foot. This advantageously provides access to the adhesion points. For example, this can be used for evacuation in the case of fixing to a prepreg in the autoclave process.

According to a development, a retaining device is attached to the at least one adhesive foot. The retaining device can be configured to join the adhesive retainer to a component. The adhesive retainer can thus be simply and efficiently attached to a structure and used to retain all kinds of components. For example, a configuration of the adhesive retainer is provided in which an insertion recess is made in the adhesive foot into which a retaining device can be inserted to engage around a line or cable to be received.

The retaining device can be attached to a side of the adhesive foot opposite the supporting base region. This development is a simple configuration of the adhesive retainer. For example, a component can be easily fastened to a surface of an aircraft structure by this configuration of the adhesive retainer. Furthermore, the retaining device can be configured for retaining a line, a cable, a pipe, a hose or the like. The adhesive retainer can thereby be used in a very versatile manner in the aviation or aerospace sector. Accordingly, the method can comprise joining a component to the adhesive retainer by a retaining device attached to the at least one adhesive foot.

The above embodiments and developments can be combined together in any sensible manner. Further possible embodiments, developments and implementations of the disclosure herein also include not explicitly mentioned combinations of features of the disclosure herein which have been previously described or are described in the following with reference to the embodiments. In particular, a person skilled in the art will also add individual aspects as improvements or supplements to the respective basic form of the present disclosure.

BRIEF DESCRIPTION OF THE DRAWINGS

In the following, the present disclosure will be described in more detail with reference to the embodiments shown in the schematic figures, in which.

Figure 1A:
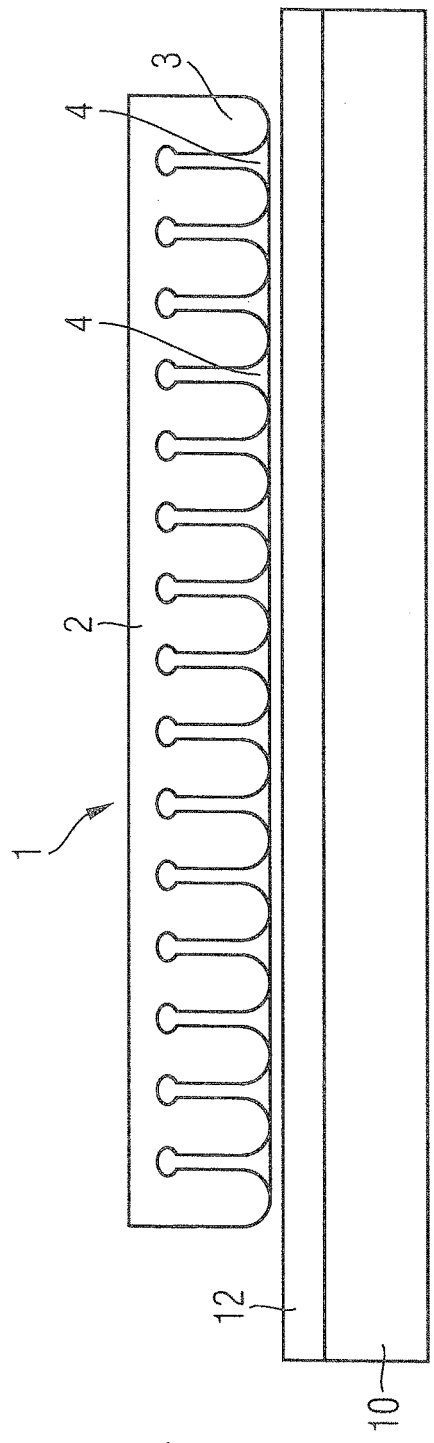
FIG. 1A, 1B are schematic cross-sectional views of an adhesive retainer according to the disclosure herein before and after being mounted on a structure according to an embodiment of the disclosure herein.

The accompanying figures are to provide a further understanding of the embodiments of the disclosure herein. They illustrate embodiments and, together with the description, explain principles and concepts of the disclosure herein. Other embodiments and many of the mentioned advantages are revealed in the drawings. The elements of the drawings have not necessarily been shown true-to-scale relative to one another.

In the drawings, identical, functionally identical and identically functioning elements, features and components have been provided with the same reference numerals in each case, unless indicated otherwise.

DETAILED DESCRIPTION

Figure 1B:
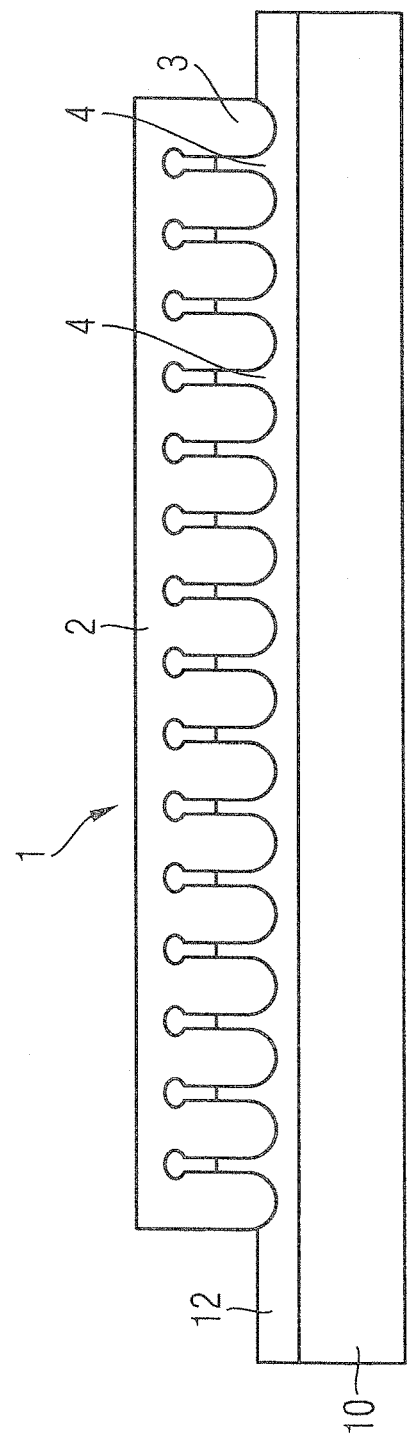

FIGS. 1A and 1B are schematic cross-sectional views of an adhesive retainer according to the disclosure herein before (FIG. 1A) and after (FIG. 1B) being mounted on a structure according to an embodiment of the disclosure herein.

In FIG. 1, reference numeral 1 denotes an adhesive retainer. The adhesive retainer 1 is configured to fix one or more components or elements to a structure 10. For the sake of clarity, the component is not shown in this figure or in the following figures. The component can be a line, a cable, a pipe, a hose or the like. The structure 10 can be for example a primary structure 10 of an aircraft. In this embodiment, the adhesive retainer 1 which is shown is used as an adapter to fasten the component to the primary structure 10 of the aircraft. For example, the described adhesive retainer 1 is used if other fastening options such as holes or screw and riveted connections are not permitted or desired. In principle, all the embodiments of the adhesive retainer 1 according to the disclosure herein described in the following can be used with suitable adaptations for any other aircraft or spacecraft, other vehicles and for further different areas of use.

The adhesive retainer 1 comprises an adhesive foot 2 which is formed with a substantially planar supporting base region 3. The supporting base region 3 is provided on the adhesive foot 2 with receiving openings 4 which extend like capillaries through the supporting base region 3 into the interior of the adhesive foot 2 (in this respect see also FIG. 1C). The receiving openings 4 are distributed uniformly over the supporting base region 3. The supporting base region 3 can be for example cylindrical with a circular base surface. However, in principle, any other configurations of the supporting base region 3 are also provided, for example having a rectangular or square cross section or with more complex forms.

Figure 4:
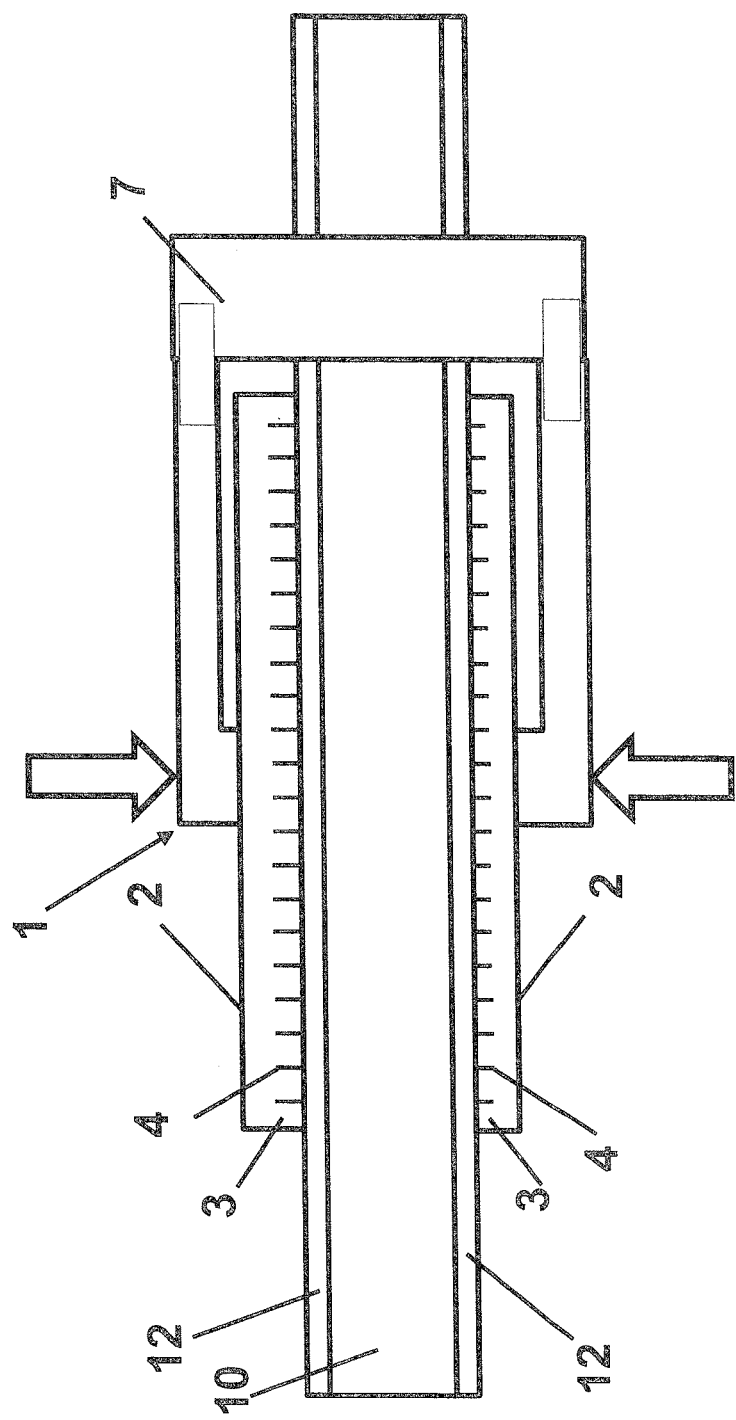
FIG. 4 is a schematic cross-sectional view of an adhesive retainer according to the disclosure herein after being mounted on a structure according to a further embodiment of the disclosure herein.

In this embodiment, the adhesive retainer 1 has just one adhesive foot 2. However, configurations with a plurality of adhesive feet 2 are also provided (an example is shown in FIG. 4). The adhesive retainer 1 consists of or comprises plastics material and has been produced for example as a single-piece component by an additive-layer manufacturing method (3D printing). Three-dimensional printing methods of this type can be used in a very flexible manner to also produce complex plastics articles. For example, in the embodiment shown in FIG. 1, the receiving openings 4 extend substantially vertically from the supporting base region 3 into the interior of the adhesive foot 2. However, in 3D printing, other arrangements can also be realized at no great expense.

The receiving openings 4 are configured to form an integral bond between the adhesive retainer and the structure 10. For this purpose, the structure 10 is covered with a liquid, solidifiable bonding substance. Lacquers, paints, adhesives and synthetic resins, inter alia, are provided as the bonding substance. In FIG. 1A,B, the structure 10 is shown covered with a lacquer 12 for example. However in principle, any other bonding substance can be used which can produce an integral bond between an adhesive retainer 1 of this type and a structure 10.

The receiving openings 4 are configured so that when the adhesive retainer 1 is placed on the structure 10 covered with lacquer 12, the openings receive lacquer 12.

FIG. 1A shows the adhesive retainer 1 before being mounted on the structure 10. In this figure, the adhesive retainer 1 is still at a distance above the structure 10. FIG. 1B shows the adhesive retainer 1 after it has been placed on the structure 10. The lacquer 12 has risen up into the receiving openings 4 so that the level of the lacquer 12 inside the receiving openings 4 is higher than on the surface of the structure 10 in the surroundings of the adhesive retainer 1 (cf. the region in FIGS. 1A and 1B identified by reference numeral 12). To fix the adhesive retainer 1 to the structure 10, the lacquer 12 at least in the region of the applied adhesive foot 1 still has to be solidified by appropriate methods (in the simplest case, this means a simple drying of the lacquer 12). The adhesive retainer 1 thereby forms an integral bond with the structure 10 by the lacquer 12. In this embodiment, the lacquer 12 serves in a sense as an adhesive between the adhesive retainer 1 and the structure 10.

The lacquer 12 is received in the receiving openings 4 due to what is known as capillary ascension. This is a possible form of the physical capillary effect which occurs due to the interaction of a liquid with a capillary-like constriction, i.e. for example with a thin pipe, a gap or another cavity. Here, there is an interaction between the adhesive forces of the corresponding liquid and the cohesive forces of the liquid with the solid wall material of the capillaries. Capillary ascension occurs when the corresponding liquid wets the material of the capillaries. In this case, the liquid rises in the capillaries and forms a concave surface which is at a higher level than the liquid in the surroundings of the capillaries (for example when a small thin pipe is immersed into a container filled with liquid).

The specific behavior of the liquid, i.e. for example the rising height of the liquid inside the capillaries depends on various factors. Thus, the material of the capillary and also of the liquid is critical, for example the density or viscosity of the liquid or the porosity of the capillaries. Furthermore, the arrangement and shape of the capillaries is relevant, for example the cross-sectional area of the capillaries. In the case of a substantially circular cylindrical capillary, the diameter size is particularly significant and has to be optimized accordingly subject to liquid and capillary material.

In the embodiment shown in FIG. 1A,1B, the adhesive retainer 1 is placed on the structure 10 covered with lacquer 12. The lacquer 12 wets the supporting base region 3 and rises into the receiving openings 4 due to the adhesive forces acting between the lacquer 12 and the adhesive retainer 1. Consequently, the inside surface of the receiving openings 4 is also wetted with lacquer 12 and the effective adhesion surface, i.e. the bonding surface by which the adhesive retainer 1 and the structure 10 are joined together by the lacquer 12, increases accordingly by this amount, multiplied by the number of receiving openings 4. The effective adhesion surface can be maximized due to the shape and arrangement of the receiving openings 4 inside the adhesive foot 2.

The adhesive retainer 1 shown in FIG. 1A,B has an effective adhesion surface which is several times greater than that of conventional planar adhesion surfaces, for example an adhesion surface corresponding to the support surface shown in FIG. 1A,B. This makes it possible to use not only conventional adhesives for fixing an adhesive retainer 1 according to the disclosure herein, but also lacquer 12 or paints as shown by way of example in FIG. 1A,1B.

In general, the adhesive bond which is produced with the same support surface is significantly more loadable than in the case of conventional adhesive bonds, in which two planar surfaces are adhesively bonded one on top of the other. The adhesive retainer 1 according to the disclosure herein can thereby be configured to be significantly more weight efficient, which in turn saves fuel and reduces costs, particularly also compared to purely mechanical connections using screws and rivets. Furthermore, an adhesive retainer 1 of this type can be mounted in a flexible, simple and rapid manner without expensive additional aids. In particular in this case, the adhesive retainer 1 can be mounted on the structure 10 even while the structure 10 is being lacquered, as long as the lacquer 12 has not cured.

Figure 1C:
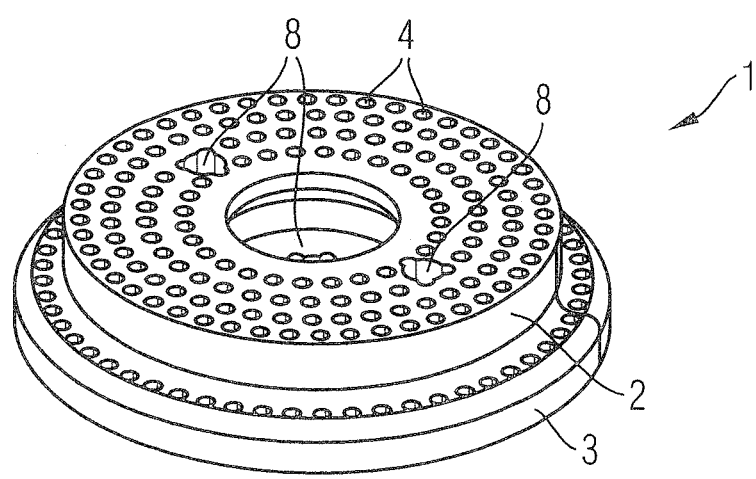
FIG. 1C is a schematic perspective view of an adhesive retainer according to the disclosure herein obliquely from above according to a further embodiment of the disclosure herein.

FIG. 1C is a schematic perspective view of an adhesive retainer 1 according to the disclosure herein obliquely from above according to a further embodiment of the disclosure herein.

This adhesive retainer 1 is also formed in one piece from plastics material. The supporting base region 3, not shown in FIG. 1C, of the adhesive retainer 1 can be configured for example similarly to that of the adhesive retainer 1 shown in FIGS. 1A and 1B. However, in the case shown in FIG. 1C, the receiving openings 4 extend through the supporting base region 3 and the adhesive foot 2. A retaining device 8 has been formed in the surface of the adhesive retainer 1 opposite the supporting base region 3. This retaining device can be, for example the connection for a plug-in connection or clip connection which is configured to receive a component or element. For example, an intermediate part can also be insertable to engage around a line or cable to be received. Differently sized configurations of the adhesive retainer 1 are provided, from a few millimeters to many centimeters. Both the size of the adhesive retainer 1 and that of the receiving openings 4 can be selected according to the area of use of the adhesive retainer 1. Accordingly, the specific size of the receiving openings 4 is also variable. The embodiment shown in FIG. 1C provides receiving openings 4, for example, in the region of tenths of millimeters to a few millimeters.

Figure 2A:
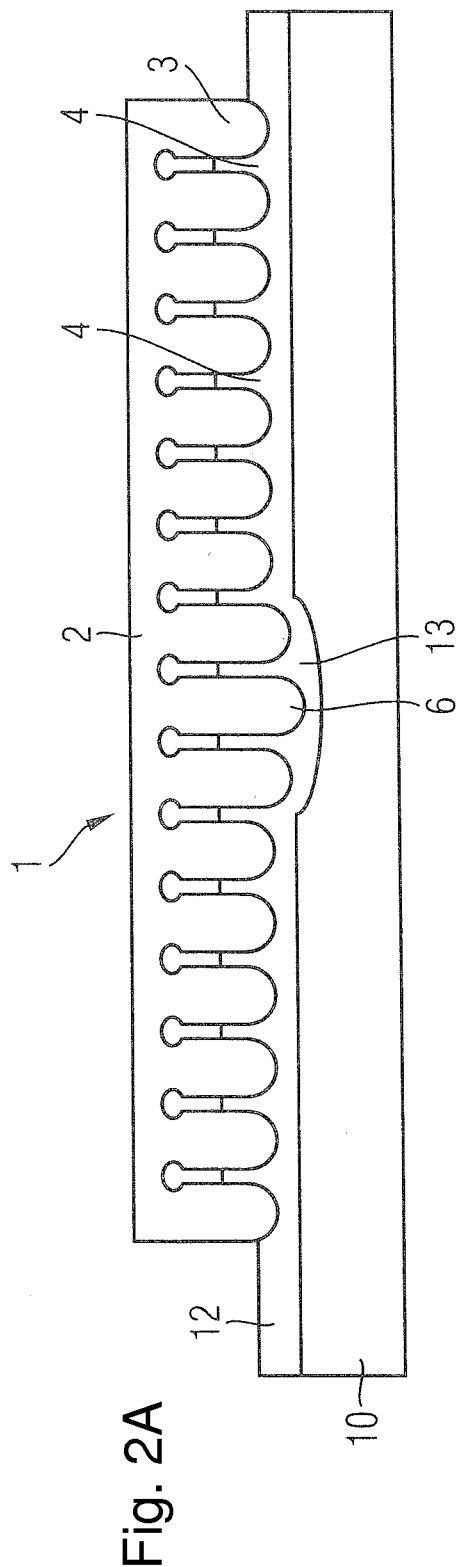
FIG. 2A, 2B are schematic cross-sectional views of adhesive retainers according to the disclosure herein after being mounted on a structure according to two further embodiments of the disclosure herein.
Figure 2B:
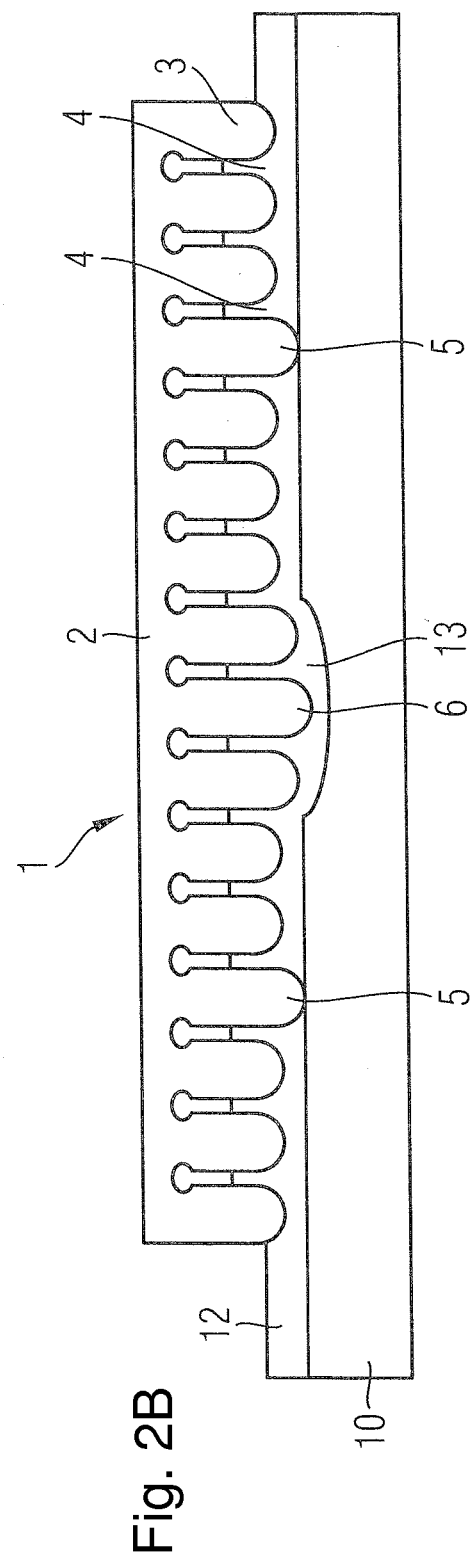

FIGS. 2A and 2B are schematic cross-sectional views of adhesive retainers 1 according to the disclosure herein after being mounted on a structure 10 according to two further embodiments of the disclosure herein.

The basic construction of the adhesive retainers 1 shown in FIGS. 2A and 2B and the mounting thereof substantially corresponds to that of the adhesive retainer 1 from FIGS. 1A and 1B. The adhesive retainer 1 in FIG. 2A is provided in the centre of the supporting base region 3 with fixing pins 6 which project from the supporting base region 3. The fixing pins 6 serve to fix the adhesive retainer 1 in a particular position of the structure 10. In this embodiment, the desired position is provided with a marker 13 which can be, for example a hole or another depression in the surface of the structure 10. For example, the marker 13 can be produced by laser ablation of the surface of the structure 10. The fixing pin or pins 6 can thus be easily fixed in the desired position while the adhesive retainer 1 is being mounted, by introducing the adhesive retainer 1 with the fixing pins 6 into the corresponding marker.

The adhesive retainer 1 shown in FIG. 2B also has a plurality of projecting spacer pins 5 on the supporting base region 3. When the adhesive retainer 1 is placed on a structure 10 covered with bonding substance (in this case with lacquer 12), the spacer pins 5 make it possible to precisely adjust the thickness of the bonding layer, so that optimum adhesion characteristics can be ensured. The thickness of the bonding layer is defined by the distance by which the spacer pins 5 project beyond the supporting base region 3. In general, at least three spacer pins 5 of this type are required which are not arranged on a line. Alternatively, such spacer pins 5 can also be used to define separate bonding regions so that an adhesive retainer 1 can be fixed to a structure 10 over a plurality of surfaces. The use of spacer pins 5 further simplifies the mounting of such adhesive retainers 1. The fixing pins 6 allow a convenient adjustment of the position of the adhesive retainer 1, while the spacer pins 5 ensure an optimum orientation of the adhesive retainer 1 in the adjusted position and an optimum adhesive layer.

Figure 3A:
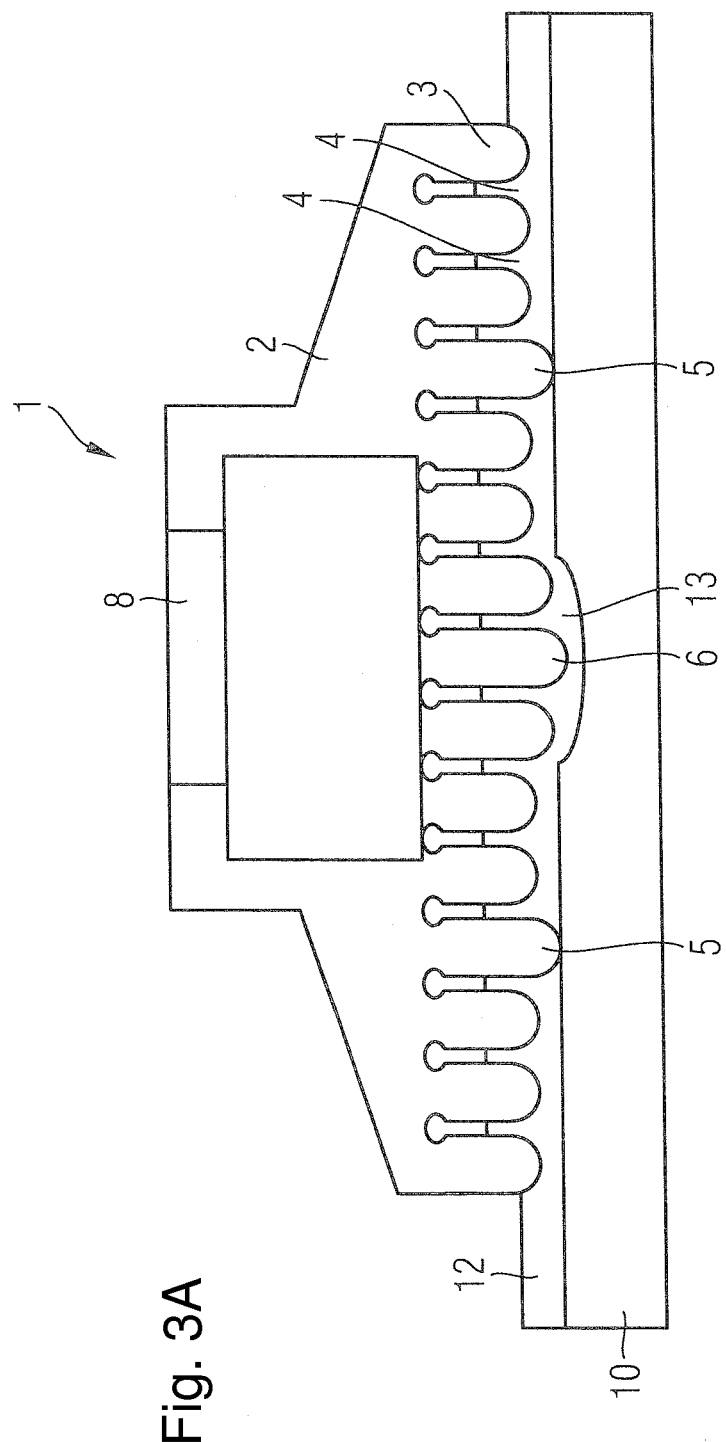
FIG. 3A, 3B, 3C are schematic cross-sectional views of an adhesive retainer according to the disclosure herein during mounting on a structure according to three different embodiments of the disclosure herein.
Figure 3B:
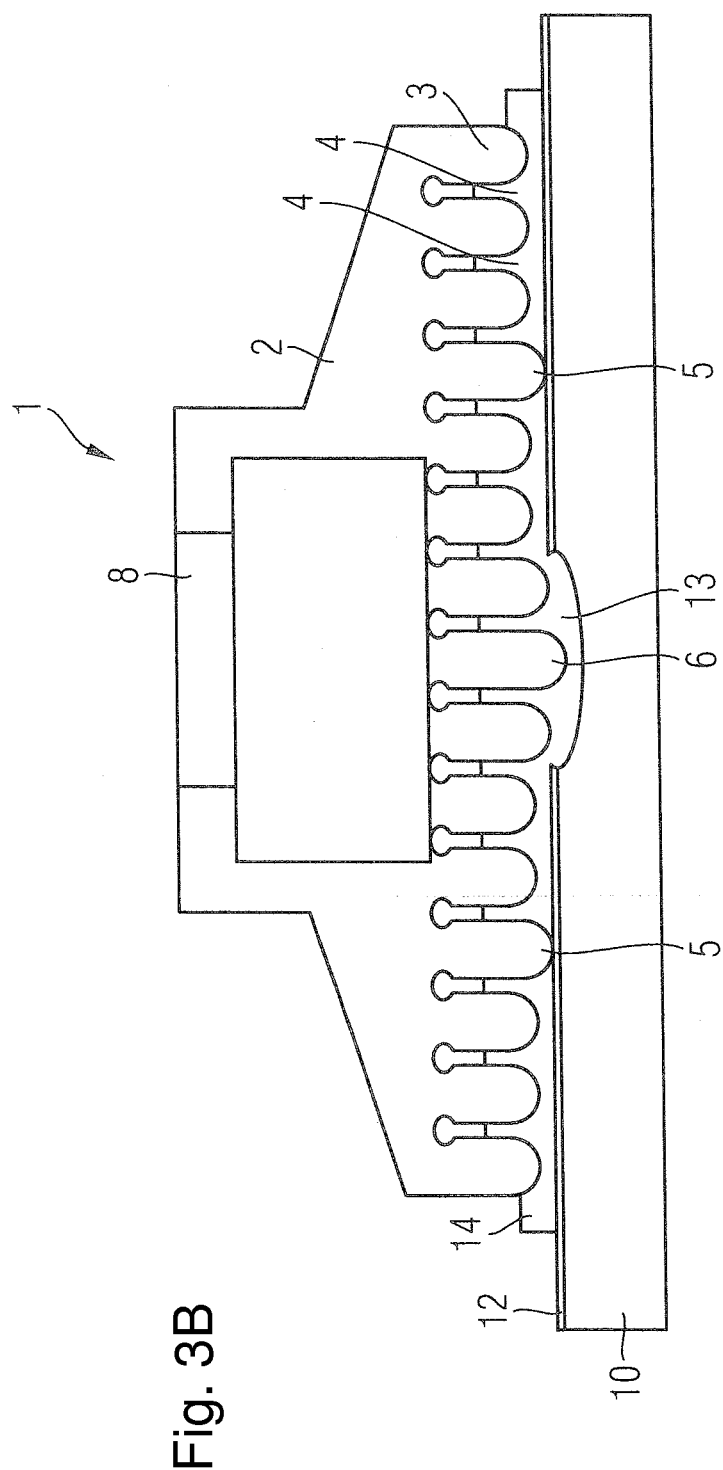
Figure 3C:
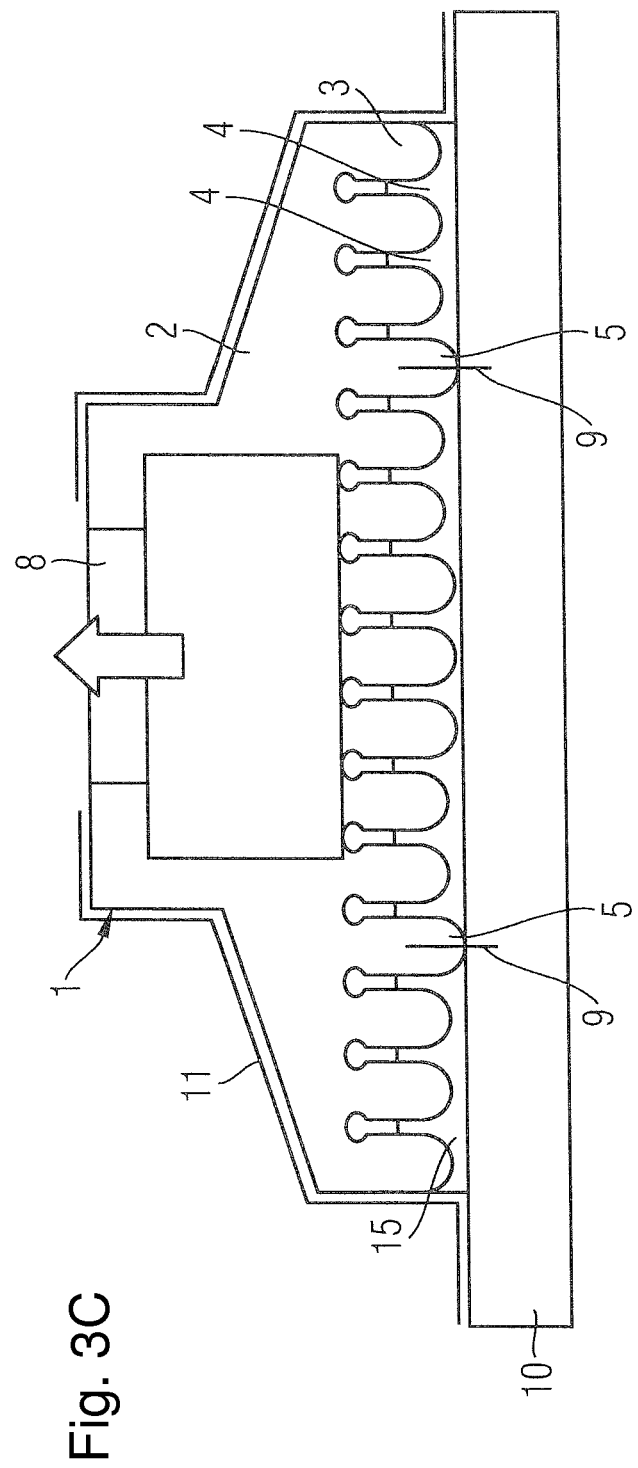

FIGS. 3A, 3B and 3C are schematic cross-sectional views of an adhesive retainer 1 according to the disclosure herein during mounting on a structure 10 according to three different methods of the disclosure herein.

The adhesive retainer 1 shown in the figures corresponds in principle to the adhesive retainer from FIG. 2B. Consequently, this adhesive retainer 1 also comprises an adhesive foot 2 which is configured with a substantially planar supporting base region 3, a supporting base region 3 with receiving openings 4 which extend like capillaries through the supporting base region 3 into the interior of the adhesive foot 2, fixing pins 6 and spacer pins 5. The adhesive retainer 1 also has a retaining device 8. This can be configured similarly to the one shown in FIG. 1C, for example.

FIG. 3A shows the mounting of the adhesive retainer 1 on a structure 10 (for example the primary structure of an aircraft) covered with a lacquer 12 The sequence of the mounting method corresponds here to the method already described for FIGS. 1A and 1B. First of all, the adhesive retainer 1 is placed onto the structure 10 into the position marked by the marker 13 via the supporting base region 3 of the adhesive foot 2 and the fixing pins 6 projecting therefrom, In so doing, the spacer pins 5 ensure the desired thickness of the lacquer layer, i.e. of the adhesive layer. Due to the capillary effect, both the supporting base region 3 and the receiving openings 4 are wetted inside with lacquer 12. Finally, the lacquer 12 is dried to produce an integral bond between adhesive retainer 1 and structure 10.

FIG. 3B shows the mounting of the adhesive retainer 1 on a lacquered structure 10. In contrast to FIG. 3A, in this case the lacquer 12 has already cured. To mount the adhesive retainer 1, a marker 13 is applied through the lacquer 12 to the structure 10, for example by ablating the lacquer 12 in this area using a laser. In the next step, the adhesion area is covered on and around the marker 13 with adhesive 14 and the adhesive retainer 1 is positioned thereon. In this case, the adhesive 14 passes into the receiving openings 4 corresponding to FIG. 3A. An integral bond is obtained due to the solidification of the adhesive 14. To achieve optimum adhesion characteristics, the lacquer 12 or the structure 10 can be pretreated accordingly (for example by cleaning, grinding etc.).

FIG. 3C shows the mounting of the adhesive retainer 1 on a prepreg 10, i.e. on a semi-finished product consisting of or comprising carbon fibers which are embedded in an uncured matrix of synthetic resin 15. In a subsequent production step, for example, the prepreg 10 can be baked through in an autoclave to form a structural component of an aircraft, i.e. it can be cured by being subjected to pressure and temperature. In this case, the adhesive retainer 1 is placed on a layer of synthetic resin 15 on the prepreg 10. Furthermore, the adhesive retainer 1 is fixed to the prepreg 10 by fixing needles 9. In this case, the synthetic resin serves as a bonding substance to form an integral bond. Corresponding to FIGS. 3A and 3B, here the synthetic resin 15 passes into the receiving openings 4. The bond is then solidified in the following autoclave process.

For this purpose, the prepreg 10 is covered with a film 11 and evacuated. Evacuation can take place via the receiving openings 4 in the adhesive retainer 1 (indicated by the arrow in FIG. 3C). Thereafter, the prepreg 10 together with the adhesive retainer 1 fixed thereto are subjected to pressure and temperature in the autoclave. This cures the synthetic resin 15 and produces an integral bond between adhesive retainer 1 and prepreg 10. In this case, the adhesive retainer 1 is advantageously mounted while the structural component is being produced.

FIG. 4 is a schematic cross-sectional view of an adhesive retainer 1 according to the disclosure herein after mounting on a structure 10 according to an embodiment of the disclosure herein.

The structure 10 shown in FIG. 4 can be for example in the form of a rod or plate. The structure 10 is covered on two sides with a layer of lacquer 12. In this embodiment, the adhesive retainer 1 is configured with two separate but identically formed adhesive feet 2 which are coupled together by a connection element 7. The connection element 7 itself can be configured for example with further retaining devices to join the adhesive retainer 1 to further components or elements. The adhesive feet 2 themselves are configured corresponding to the adhesive foot from FIGS. 1A and 1B. The adhesive retainer 1 is also mounted in a corresponding manner.

However, for this purpose, both adhesive feet have to be placed on an appropriate side of the structure 10 either simultaneously or successively so that the lacquer 12 can pass into the receiving openings 4 and can cure to produce an integral bond (indicated by arrows in FIG. 4). An adhesive retainer 1 of this type can be used for example to mount a component on regions of an aircraft which are difficult to access. Furthermore, the use of two adhesive feet 1 doubles the effective adhesion surface and thereby also provides a more highly loadable fixing.

Figure 5:
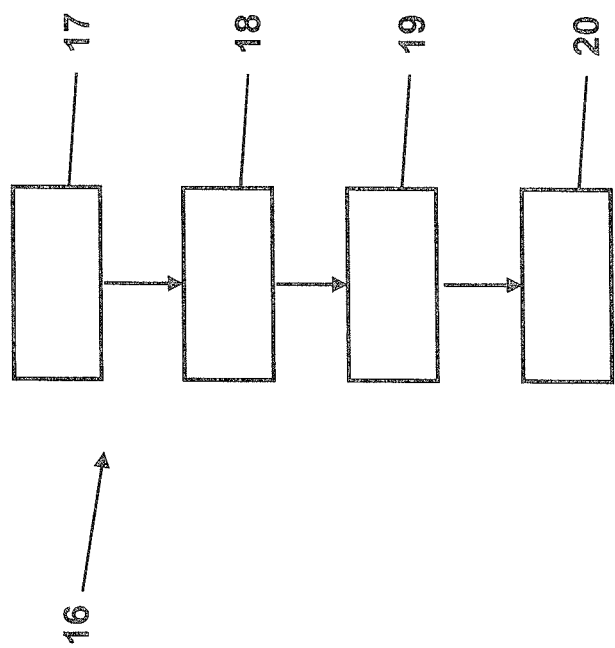
FIG. 5 is a schematic flow chart of a method according to the disclosure herein for mounting adhesive retainers according to the disclosure herein on a structure.

FIG. 5 is a schematic flow chart of a method 16 according to the disclosure herein for mounting adhesive retainers 1 according to the disclosure herein on structures 10, as shown for example in the previous figures.

The method 16 comprises, in a first step 17, placing a supporting base region 3 of an adhesive foot 2 of an adhesive retainer 1 on the structure 10 covered with a liquid, solidifiable bonding substance. In a second step 18, the supporting base region 3 of the adhesive foot 2 is wetted by the liquid bonding substance and the liquid bonding substance is received by the receiving openings which extend like capillaries through the supporting base region 3 into the interior of the adhesive foot 2. A third step 19 solidifies the liquid bonding substance at least in the region of the applied adhesive foot 2 before, in a fourth step 20, the adhesive retainer 1 is joined to a component or element by a retaining device 8 attached to the at least one adhesive foot 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An adhesive retainer for fixing to a structure, comprising
    at least one adhesive foot,
    a supporting base region formed on the adhesive foot, and
    receiving openings which extend like capillaries through the supporting base region into the interior of the adhesive foot,
    wherein the receiving openings are configured to form an integral bond with the structure, such that when the adhesive foot is placed on the structure, which is covered for this purpose with a liquid, solidifiable bonding substance, the receiving openings receive bonding substance due to capillary ascension.

2. The adhesive retainer according to claim 1, wherein the receiving openings are configured to receive lacquer and/or paint and/or adhesive and/or synthetic resin as the liquid bonding substance.

3. The adhesive retainer according to claim 1, wherein the supporting base region is substantially planar.

4. The adhesive retainer according to claim 1, wherein the receiving openings extend substantially vertically from the supporting base region into the interior of the adhesive foot.

5. The adhesive retainer according to claim 1, wherein the adhesive retainer comprises plastic material.

6. The adhesive retainer according to claim 1, wherein the adhesive retainer is formed in one piece.

7. The adhesive retainer according to claim 1, wherein the supporting base region of the at least one adhesive foot is formed with three or more projecting spacer pins.

8. The adhesive retainer according to claim 1, wherein the supporting base region of the at least one adhesive foot is formed with at least one projecting fixing pin.

9. The adhesive retainer according to claim 1, wherein two adhesive feet are formed which can be coupled together by a connection element.

10. The adhesive retainer according to claim 1, wherein at least some of the receiving openings extend through the at least one adhesive foot.

11. The adhesive retainer according to claim 1, furthermore with a retaining device which is attached to the at least one adhesive foot and is configured to join the adhesive retainer to a component.

12. The adhesive retainer according to claim 11, wherein the retaining device is attached to a side of the adhesive foot opposite the supporting base region.

13. A method for fixing an adhesive retainer to a structure, comprising:
    placing a supporting base region of an adhesive foot of an adhesive retainer on the structure covered with a liquid, solidifiable bonding substance;
    wetting the supporting base region of the adhesive foot with the liquid bonding substance and receiving the liquid bonding substance in receiving openings extending like capillaries through the supporting base region into the interior of the adhesive foot; and
    solidifying the liquid bonding substance at least in the region of the applied adhesive foot.

14. The method according to claim 13, wherein the liquid, solidifiable bonding substance comprises lacquer and/or paint and/or adhesive and/or synthetic resin.

15. The method according to claim 14, wherein the liquid, solidifiable bonding substance is a synthetic resin and the solidification step comprises curing using an autoclave.

16. The method according to claim 15, further comprising fixing the adhesive foot on the structure by at least one fixing needle.

17. The method according to claim 15, further comprising covering the structure with a film and evacuating the covered structure through at least some of the receiving openings in the adhesive foot.

* * * * *